(12) United States Patent
Boisson et al.

(10) Patent No.: US 8,946,368 B2
(45) Date of Patent: Feb. 3, 2015

(54) CATALYTIC SYSTEMS MADE OF A COMPLEX OF RARE EARTHS FOR STEREOSPECIFIC POLYMERISATION OF CONJUGATED DIENES

(75) Inventors: Christophe Boisson, Tramoyes (FR); Olivier Rolland, Paris (FR); Julien Thuilliez, La Roche Blanche (FR)

(73) Assignees: Compagnie Generale des Etablissements, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 251 days.

(21) Appl. No.: 13/318,022

(22) PCT Filed: Apr. 27, 2010

(86) PCT No.: PCT/EP2010/055636
§ 371 (c)(1),
(2), (4) Date: Jan. 17, 2012

(87) PCT Pub. No.: WO2010/125072
PCT Pub. Date: Nov. 4, 2010

(65) Prior Publication Data
US 2012/0123070 A1    May 17, 2012

(30) Foreign Application Priority Data
Apr. 28, 2009  (FR) .................................. 09 02073

(51) Int. Cl.
C08F 36/06 (2006.01)
C08F 36/08 (2006.01)
C08F 4/52 (2006.01)
C08F 4/602 (2006.01)

(52) U.S. Cl.
USPC ........ 526/335; 526/164; 526/142; 526/123.1; 526/124.1; 502/125; 502/127; 502/118; 502/103; 502/104

(58) Field of Classification Search
USPC ......... 502/102, 103, 104, 117, 118, 123, 125, 502/128; 526/164, 172, 135, 335, 142
See application file for complete search history.

(56) References Cited

U.S. PATENT DOCUMENTS 3,297,667 A * 1/1967 Von Dohlen et al. .......... 526/160
4,623,707 A * 11/1986 Bedell et al. .................. 526/142
7,300,903 B2    11/2007 Fujita et al.

FOREIGN PATENT DOCUMENTS

| CN | 101906110 A | * | 12/2010 | ............ C08F 136/06 |
| JP | 4-154819 A | * | 5/1992 | ............. C08F 36/06 |
| JP | 4-154819 | | 5/1993 | |
| WO | WO 03/033545 A2 | | 4/2003 | |

OTHER PUBLICATIONS

Bi et al. (CN 101906110 A) Dec. 8, 2010; Derwent abstract in English.*
Ikematsu et al. (JP 4-154819) May 27, 1992; abstract and translation in English.*
International Search Report mailed Jul. 20, 2010 for International Application No. PCT/EP2010/055636.
Database WPI Week 199228, Thomson Scientific, London, GB; 1992-230599, XP002560094 & JP 4154819A (Asahi Chem Ind Co Ltd) May 27, 1992 Abstract.
Monteil, V. et al., "Polymerization of Butadiene and Copolymerization of Butadiene with Styrene Using Neodymium Amide Catalysts," Polymer International, Barking, GB, vol. 53, Jan. 1, 2004, pp. 576-581, XP008033681.

* cited by examiner

*Primary Examiner* — Rip A. Lee
(74) *Attorney, Agent, or Firm* — Dickinson Wright PLLC

(57) ABSTRACT

The present invention relates to a multi-component catalytic system that can be used for the cis-1,4 stereospecific polymerization of conjugated dienes. The system is based on:
(i) a rare-earth complex of Formula (II) $Ln(A)_3(B)_n$, Ln being a rare-earth metal, A a ligand, B a Lewis base or a solvent molecule and n a number from 0 to 3;
(ii) an alkylating agent;
(iii) a compound based on an aromatic ring and having at least two heteroatoms chosen from the elements O, N, S, P, and corresponding to the Formula (III):

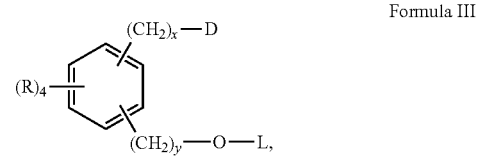

Formula III in which the R groups each denote hydrogen, an alkyl radical optionally comprising one or more heteroatoms (N, O, P, S, Si) or one or more halogen atoms, a halogen atom, a group based on one or more heteroatoms (N, O, P, S, Si); x and y are integers from 0 to 6; D is a group having a chemical function, one of the atoms of which has a non-bonding pair; L being an atom from column 1 of the Periodic Table.

23 Claims, No Drawings

CATALYTIC SYSTEMS MADE OF A COMPLEX OF RARE EARTHS FOR STEREOSPECIFIC POLYMERISATION OF CONJUGATED DIENES

This application is a 371 national phase entry of PCT/EP2010/055636, filed 27 Apr. 2010, which claims benefit under 35 U.S.C. §119 of the filing date of FR 0902073, filed 28 Apr. 2009, the entire contents of each of which is incorporated by reference herein for all purposes.

BACKGROUND

1. Field

The present invention relates to a multi-component catalytic system that can be used for the cis-1,4 stereospecific polymerization of conjugated dienes. More particularly, the present invention relates to a catalytic system comprising a rare-earth complex, and also to a process for preparing said catalytic system and the use of this catalytic system for the preparation of diene elastomers having a high content of cis-1,4 linkages.

2. Description of Related Embodiments

Boisson et al., Macromol. Chem. Phys., 1999, 200, 1163-1166 and Monteil et al., Polymer Int., 2004, 53, 576-581 describe the use of multicomponent catalytic systems for the polymerization of butadiene comprising:
  a neodymium salt of tris(amide) type of formula $Nd[N(TMS)_2]_3$, namely neodymium tris[N,N-bis(trimethylsilyl)amide],
  an alkylaluminium of formula $Al(i-Bu)_3$, and
  an alkylaluminium halide, formula $AlEt_2Cl$.

These catalysts are prepared in situ and used for the polymerization of butadiene and for the copolymerization of butadiene and styrene. The molecular weight distribution of the polybutadienes synthesized is broad and multimodal, which is the result of a poor control of the polymerization. Moreover, such a molecular weight distribution may be detrimental in view of certain applications of the diene elastomer prepared, such as in particular in tyres for motor vehicles.

In the same spirit, Patent Application WO2003033545 describes multicomponent catalytic systems for the polymerization of conjugated dienes, some of which are based on a neodymium salt of tris(amide) type, for example of formula $Nd[N(TMS)_2]_3$, and on a co-catalyst. In the exemplary embodiments the active species formed by reaction of the neodymium salt and the co-catalyst is of cationic type since the co-catalyst systematically comprises an aluminoxane (modified methylaluminoxane—MMAO or isobutylaluminoxane—IBAO). Optionally, an alkylaluminium halide or a borane ($B(C_6F_5)_3$) is added to the catalytic system illustrated.

Document U.S. Pat. No. 3,297,667 also describes multi-component catalytic systems based on
  (i) a rare-earth compound,
  (ii) a bidentate organic ligand,
  (iii) a halide, and
  (iv) an alkylaluminium.

The catalytic system is prepared by reaction of (i) with (ii) which results in a chelated isolated species of the rare-earth metal. This species is then brought into contact with the halide and the alkylaluminium. As compound (i), the process for preparing catalytic systems of this document essentially uses cerium chloride. Yet, rare-earth chlorides may have an unsatisfactory reactivity with certain organic ligands (ii) present in the reaction media, due to a low solubility of the chlorides in these media.

Furthermore, Patent Document U.S. Pat. No. 7,300,903 B2 describes a process for polymerizing olefins using a catalytic system based on:
  an isolated compound based on a transition metal corresponding to the Formula (I) below, for the complete definition of which reference should be made to the text of the patent, Formula (I)

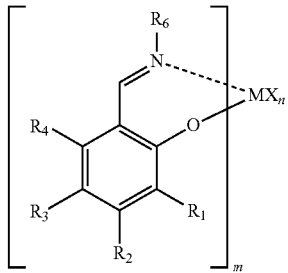

in which M is a metal belonging to groups 3 to 11 of the Periodic Table of the Elements,
  at least one compound selected from:
    an organometallic compound,
    an organoaluminium compound containing an oxygen atom,
    a compound that can react with the compound based on a transition metal in order to form an ion pair.

According to the patent, in the Formula I, the metal M that is favoured and described in the examples belongs mainly to group 4. It is titanium, zirconium or optionally hafnium. All the examples of this patent relating to ethylene and butadiene copolymerization tests were carried out starting from catalytic systems based on titanium or zirconium. Depending on the experimental conditions and the nature of the catalytic system, these tests made it possible, in particular to obtain copolymers where the proportion of butadiene is very low and reaches at most 6.6 mol % (Examples 150 to 157). Although no butadiene homopolymerization test is described, the poor capacity of the catalytic systems of this patent to insert this monomer implies that these systems are unsuitable for the cis-1,4 stereospecific polymerization of butadiene.

In view of an application as a tyre for motor vehicles and more particularly in the tread, it is essential to have diene elastomers of specific microstructure, in particular polybutadiene having a high content of cis-1,4 linkages. Furthermore, a controlled, or even narrow, molecular weight distribution makes it possible to adjust the macrostructural characteristics of the elastomer as best possible as a function of the properties desired during use in the tread. Therefore catalytic systems and polymerization processes that make it possible to reproducibly obtain diene elastomers having specific microstructure and macrostructure characteristics, and in particular diene elastomers having a high content of cis-1,4 linkages and having a controlled molecular weight distribution are constantly being sought.

SUMMARY

The inventors have discovered, during their research, a novel multicomponent catalytic system having a satisfactory catalytic activity in stereospecific polymerization of conjugated dienes that makes it possible to obtain diene elastomers such as polybutadiene or polyisoprene, having a content of cis-1,4 linkages that is high, substantially greater than 90%. This novel catalytic system is based on the combination of at least three constituents, namely a rare-earth complex, an alkylating agent and a compound based on an aromatic ring and having at least two heteroatoms. This catalytic system has, in addition, the advantage of being able to control, or even significantly reduce, the polydispersity index relative to a system that comprises only the rare-earth complex and the alkylating agent. The polydispersity index $(M_w/M_n)$–$M_w$ being the weight-average molecular weight and $M_n$ the number-average molecular weight—can be controlled, or even reduced, depending on the nature of the reactants used and the operating conditions employed.

Consequently, a first subject of the invention is a catalytic system based on at least:

(i) a rare-earth complex $Ln(A)_3(B)_n$ of Formula (II), in which Ln is a rare-earth metal from the family of lanthanides or yttrium or scandium, A is a ligand chosen from the family of amides, the family of alcoholates, the family of alkyls, of aryls or of benzyls, the family of borohydrides, and the family of organophosphates, B is a Lewis base and n is a number having a value ranging from 0 to 3, B and n depending on the nature of Ln and of A used in the corresponding rare-earth complex, (ii) an alkylating agent;

(iii) a compound based on an aromatic ring and having at least two heteroatoms chosen from the elements O, N, S, P, and corresponding to the Formula (III):

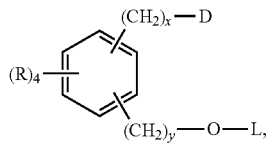

Formula III in which the R groups are identical to or different from one another, and each represent either:

a hydrogen atom, an aliphatic, cycloaliphatic or aromatic alkyl radical, optionally comprising one or several heteroatoms (N, O, P, S, Si) or one or more halogen atoms, a halogen atom, a group based on one or more heteroatoms (N, O, P, S, Si);

x and y are integers from 0 to 6;

D is a group having a chemical function, one of the atoms of which has a non-bonding pair;

L is an atom from column 1 of the Periodic Table;

the substituents of the aromatic ring being either in the ortho, meta or para position relative to one another, (iv) optionally, a halogen donor, and (v) optionally, a preforming conjugated diene.

Of course, the expression "based on" used to define the constituents of the catalytic system is understood to mean the mixture of these constituents and/or the product of the reaction between these constituents.

Another subject of the invention is a process for preparing the multicomponent catalytic system defined above.

Another subject of the invention is a process for preparing a diene elastomer, such as polybutadiene or polyisoprene, having a high content of cis-1,4 linkages and a controlled molecular weight distribution, or even with a significantly reduced polydispersity index. Thus, one of the constituent elements of the multicomponent catalytic system according to the invention is a rare-earth complex of Formula (II) $Ln(A)_3(B)_n$, in which Ln, A, B and n are as described above.

DETAILED DESCRIPTION OF SPECIFIC EMBODIMENTS

Ln is a rare-earth metal from the family of lanthanides or yttrium or scandium. More particularly Ln is chosen from the elements yttrium, neodymium, gadolinium or samarium. Preferably, Ln is yttrium or gadolinium. More preferably still Ln is yttrium.

In the definition of B, the expression "Lewis base" is understood to mean, in particular, ethers, amines, phosphates and thioethers. For example as an amine, mention may be made of the family of trialkylamines and aromatic amines such as pyridine or else piperazine and its derivatives. As a phosphate, mention may be made, for example, of tri-n-butylphosphate. As a thioether, mention may be made of the family of dialkyl sulphides such as dimethyl sulphide. As an ether, mention may be made, for example of diethylether, 1,2-diethoxyethane, 1,2-di-n-propoxyethane, 1,2-di-n-butoxyethane, tetrahydrofuran, dioxane, tetrahydropyran. More particularly B is an ether, preferably tetrahydrofuran (THF).

A is a ligand which may be chosen from the various types of ligands cited above.

When A is chosen from the family of amides, this includes, in particular, dialkylamides, N,N-bis(dialkylsilyl)amides and N,N-bis(trialkylsilyl)amides, the alkyl groups having between 1 and 10 carbon atoms.

When A is chosen from dialkylamides, B is preferably THF and n is preferably equal to 1. A is then preferably diisopropylamide and dimethylamide.

When A is chosen from N,N-bis(trialkylsilyl)amides, n is preferably equal to 0. A is then preferably the N,N-bis(trimethylsilyl)amide of formula —N[Si(CH$_3$)$_3$]$_2$.

When A is chosen from N,N-bis(dialkylsilyl)amides, B is preferably THF and n is preferably equal to 2 or 3. A is then preferably N,N-bis(dimethylsilyl)amide of formula —N[SiH(CH$_3$)$_2$]$_2$.

When A is chosen from the family of borohydrides, A is preferably tetrahydroborate, B is preferably THF and n is preferably equal to 2 or 3.

When A is chosen from the family of alcoholates, this includes the alcoholates of an alcohol or of a polyol derived from an aliphatic or cyclic hydrocarbon and in particular from a linear or branched aliphatic hydrocarbon having 1 to 10 carbon atoms in the linear chain, more particularly 4 to 8 carbon atoms. Mention may be made, for example, of neopentanolate.

When A is chosen from the family of alkyls, this includes the family of (trialkylsilyl)alkyls. Among this family A is preferably the (trimethylsilyl)methyl of formula —CH$_2$—Si(CH$_3$)$_3$ or the bis(trimethylsilyl)methyl of formula —CH—[Si(CH$_3$)$_3$]$_2$.

When A is chosen from the family of aryls or benzyls, the aromatic ring is preferably substituted only by 5 hydrogen atoms or by 4 hydrogen atoms and one substituent bearing a tertiary amine function or an ether function. More preferably, the A group is the dimethylaminobenzyl of formula —CH$_2$—C$_6$H$_4$[N(CH$_3$)$_2$].

When A is chosen from the family of organophosphates, this includes the organophosphates of phosphoric acid diesters of general formula (R'O)(R"O)PO(OH), in which R' and R" which are identical or different, represent an alkyl, aryl or alkylaryl radical. Among these phosphoric acid diesters, R' and R", which are identical or different, are preferably an n-butyl, isobutyl, pentyl, amyl, isopentyl, 2,2-dimethylhexyl, 1-ethylhexyl, 2-ethylhexyl, or tolyl radical. Among the family of organophosphates, A is more preferably still bis(2-ethylhexyl)phosphate.

According to one preferred aspect of the invention, in the Formula (II) of the rare-earth complex, the ligand A is chosen from the family of amides.

It will be noted that according to this aspect of the invention, according to which the ligand A is an amide, Ln preferably represents yttrium or gadolinium in the Formula (II). More preferably still, according to this preferred aspect of the invention, the rare-earth complex of Formula (II) is yttrium tris[N,N-bis(trimethylsilyl)amide] or gadolinium tris[N,N-bis(trimethylsilyl)amide] and very particularly yttrium tris[N,N-bis(trimethylsilyl)amide].

According to one aspect of the invention, the rare-earth complex may be a complex of a mixture of rare earths or else a mixture of several complexes of one or more rare earths.

Another constituent element of the multicomponent catalytic system according to the invention is an alkylating agent. As alkylating agents that can be used, mention may be made of alkylaluminium compounds, among which it is preferred to use a compound chosen from:

trialkylaluminiums, the alkyl radical being a $C_1$-$C_{10}$ alkyl radical, for example triisobutylaluminium or trioctylaluminium;

dialkylaluminium hydrides, the alkyl radical being a $C_1$-$C_{10}$ alkyl radical, for example diisobutylaluminium hydride.

It will be noted that this alkylating agent is preferably constituted of triisobutylaluminium.

Another constituent element of the multicomponent catalytic system according to the invention is a compound based on an aromatic ring and having at least two heteroatoms, chosen form the elements O, N, S, P, and corresponding to the Formula (III):

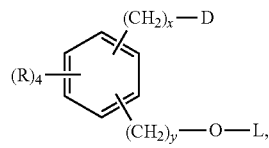

Formula III in which the R groups are identical to or different from one another, and may each be either:

a hydrogen atom, a $C_1$-$C_{20}$ aliphatic, $C_5$-$C_{20}$ cycloaliphatic or $C_6$-$C_{20}$ aromatic alkyl radical, optionally comprising one or more heteroatoms (N, O, P, S, Si), preferably nitrogen or oxygen, or one or more halogen atoms, preferably chlorine, a halogen atom, preferably chosen from chlorine or bromine, a group based on one or more heteroatoms (N, O, P, S, Si), preferably chosen from alkoxy, secondary amine, or tertiary amine functions;

x and y, which are identical or different, are integers between 0 and 6, preferably x is between 0 and 3 and y is between 0 and 3, more preferably still x=y=0;

D is a group having a chemical function, one of the atoms of which has a non-bonding pair, such as alcohol, amine, ether, imine, phosphine, thioether or thiol functions;

L is an atom from column 1 of the Periodic Table, such as hydrogen, lithium, sodium or potassium, preferably hydrogen.

The substituents $(CH_2)_x$-D and $(CH_2)_y$—O-L of the aromatic ring are preferably in the ortho or meta position relative one another, more preferably still in the ortho position.

According to one preferred aspect of the invention, in the Formula (III), D represents an imine group. The compound of Formula (III) is then more preferably chosen from those represented by the Formula (IV):

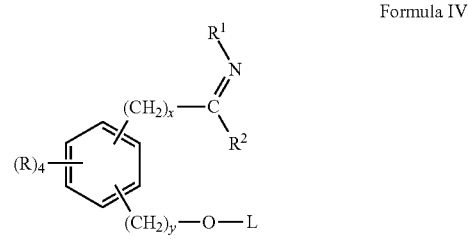

Formula IV in which R, L, x and y are as defined above and $R^1$ and $R^2$, which are identical or different, are each a hydrogen atom or a $C_1$-$C_{20}$ aliphatic, $C_5$-$C_{20}$ cycloaliphatic or $C_6$-$C_{20}$ aromatic alkyl radical.

More preferably still, among these compounds x=y=0 and L is a hydrogen atom and the compound of Formula (III) is chosen from the family of phenoxyimines.

In the family of phenoxyimines, those for which the hydroxyl substituent and the imine substituent are in the ortho position relative to one another will be preferred. These preferred compounds may be represented by the Formula (V):

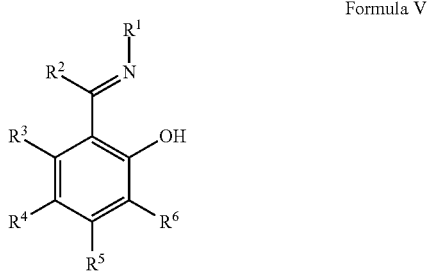

Formula V $R^1$ and $R^2$ are as defined above and $R^3$ to $R^6$ have the same definition as R above.

Among the compounds of Formula V, mention may be made more particularly of those for which $R^1$ represents a substituted or unsubstituted $C_6$-$C_{20}$, aromatic radical. Examples of these compounds are N-phenyl-3,5-di-tert-butylsalicylaldimine represented by the Formula (VI).

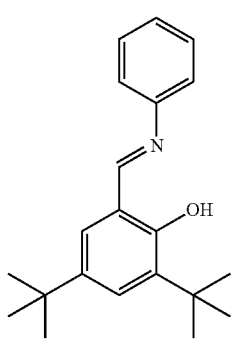

Formula VI and N-(2,6-diisopropyl)phenyl-3,5-di-tert-butylsalicylaldimine of Formula (VII):

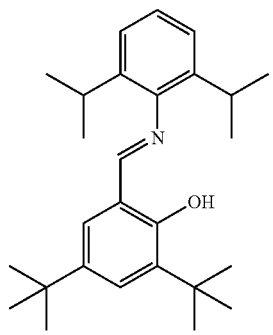 [SMILES: CC(C)c1cccc(C(C)C)c1/N=C/c1cc(C(C)(C)C)cc(C(C)(C)C)c1O]

Formula VII

According to another embodiment of the invention, the multicomponent catalytic system may comprise an optional element which is a halogen donor agent. Among these agents, mention may be made of alkylaluminium halides such as, for example, diethylaluminium chloride, diethylaluminium bromide, diethylaluminium dichloride or ethylaluminium sesquichloride. Diethylaluminium chloride is more particularly preferred.

According to another embodiment of the invention, the catalytic system according to the invention may also comprise a preforming conjugated diene. As a preforming conjugated diene that can be used to preform the catalytic system according to the invention, mention may be made of 1,3-butadiene, 2-methyl-1,3-butadiene (or isoprene), 2,3-di($C_1$ to $C_5$ alkyl)-1,3-butadiene such as for example 2,3-dimethyl-1,3-butadiene, 2,3-diethyl-1,3-butadiene, 2-methyl-3-ethyl-1,3-butadiene, or 2-methyl-3-isopropyl-1,3-butadiene, phenyl-1,3-butadiene, 1,3-pentadiene, 2,4-hexadiene, or any other conjugated diene having between 4 and 8 carbon atoms, 1,3-butadiene preferably being used.

Another embodiment of the invention consists of the combination of these two embodiments.

Preferably, in the catalytic system according to the invention, the (compound based on an aromatic ring/rare-earth metal) molar ratio may have a value between 0 and 3 (limits excluded), more preferably ranging from 0.5 to 2 (limits included).

More preferably, in the catalytic system according to the invention, the (alkylating agent/rare-earth metal) molar ratio may have a value ranging from 2 to 40 (limits included), more preferably from 2 to 10.

Also preferably, when the catalytic system according to the invention comprises a halogen donor, the (halogen donor/rare-earth metal) molar ratio may have a value ranging from 1 to 3, more preferably from 2.5 to 3.

Also preferably, when the catalytic system according to the invention comprises a preforming conjugated diene the (preforming conjugated diene/rare-earth metal) molar ratio may have a value ranging from 10 to 70, more preferably from 20 to 60.

Another subject of the invention is the preparation of the catalytic system described above.

According to a first method of preparing the catalytic system according to the invention, the constituents of the catalytic system are added directly to the polymerization solvent containing the monomer(s) to be polymerized, so as to obtain a catalyst formed in situ.

According to a second method of preparing the catalytic system according to the invention, the constituents of the catalytic system are premixed before being brought into contact with the solvent containing the monomer(s) to be polymerized, by introducing into an inert hydrocarbon-based solvent the constituents of the catalytic system, over a time of between 0 and 120 minutes, at a temperature ranging from 10° C. to 80° C., optionally above ambient temperature, generally ranging from 18° C. to 60° C., so as to obtain a premixed catalyst. The premixed catalyst thus obtained is then brought into contact with the solvent containing the monomer(s) to be polymerized.

According to a third method of preparing the catalytic system according to the invention, once the constituents of the catalytic system have been brought into contact with one another, in an inert hydrocarbon-based solvent, a small amount of preforming conjugated diene is added so as to obtain a preformed catalyst. The preforming reaction is carried out over a time of between 0 and 120 minutes at a temperature ranging from 10° C. to 80° C., optionally above ambient temperature, generally ranging from 18° C. to 30° C. The preformed catalyst thus obtained is then brought into contact with the solvent containing the monomer(s) to be polymerized.

For this purpose, it should be noted that the constituents of the catalytic system are preferably mixed before being brought into contact with the solvent containing the monomer(s) to be polymerized, that is to say before the polymerization reaction. The constituents, depending on the order of addition and their nature, may react with one another or not.

The preparation of the catalytic system according to the invention is carried out in an aliphatic or alicyclic solvent of low molecular weight, such as, for example cyclohexane, methylcyclohexane, n-heptane, or a mixture of these solvents, preferably in n-heptane, or else in an aromatic solvent such as toluene. It should be noted that non-aromatic solvents are particularly preferred.

According to a first order of addition of the constituents of the catalytic system according to the invention, the latter are added as follows: in a first step, the alkylating agent is added to the solvent; in a second step, the rare-earth complex of Formula (II) is added next; then, in a third step, where appropriate, the halogen donor agent is added; and, in a fourth step, the compound of Formula (III) and where appropriate, the preforming conjugated diene are added.

According to a second order of addition of the constituents of the catalytic system according to the invention, the latter are added as follows: in a first step, the rare-earth complex of Formula (II) is added to the solvent; in a second step the compound of Formula (III) is added; then, in a third step, the alkylating agent is added and where appropriate, in subsequent steps, the preforming conjugated diene and finally the halogen donor agent are added.

Another subject of the invention is a process for preparing diene elastomers that have a high content of cis-1,4 linkages and a controlled molecular weight distribution, or even a significantly reduced polydispersity index (Mw/Mn).

This process according to the invention consists in reacting the catalytic system described above with the monomer(s) to be polymerized, in order to obtain a diene elastomer that may be any homopolymer or copolymer obtained by homopolymerization or copolymerization of at least one conjugated diene monomer having from 4 to 12 carbon atoms, optionally with a vinylaromatic compound.

Suitable conjugated diene monomers are in particular 1,3-butadiene, isoprene, 2,3-di($C_1$ to $C_5$ alkyl)-1,3-butadienes, such as for example, 2,3-dimethyl-1,3-butadiene, 2,3-diethyl-1,3-butadiene, 2-methyl-3-ethyl-1,3-butadiene, and 2-methyl-3-isopropyl-1,3-butadiene, an aryl-1,3-butadiene, 1,3-pentadiene, and 2,4-hexadiene.

Suitable vinylaromatic compounds are for example: styrene, ortho-, meta-, para-methylstyrene, the commercial "vinyl-toluene" mixture, para-tert-butylstyrene, methoxystyrenes, chlorostyrenes, vinylmesitylene, divinylbenzene, and vinylnaphthalene.

The polymerization is preferably carried out in the presence of an inert hydrocarbon-based solvent which may be, for example an aliphatic or alicyclic hydrocarbon such as pentane, hexane, heptane, iso-octane, isobutane, cyclohexane, and methylcyclohexane or an aromatic hydrocarbon such as benzene, toluene and xylene.

The polymerization may be carried out continuously or in batch mode. The polymerization is generally carried out at a temperature between 20° C. and 150° C. and preferably in the vicinity of 30° C. to 110° C.

Advantageously, and in comparison with a process using a catalytic system that does not comprise an aromatic compound having at least two heteroatoms of Formula (III), the process according to the invention makes it possible to obtain, with an improved catalytic activity, a diene elastomer characterized by a high content of cis-1,4 linkages and by a controlled molecular weight distribution, or even with a significantly reduced polydispersity index, as demonstrated by the following examples. This elastomer may be, for example, constituted of a polyisoprene (IR) or of a polybutadiene (BR).

The aforementioned features of the present invention, and others also, will be better understood on reading the following description of several exemplary embodiments of the invention, given by way of illustration and non-limitingly.

Examples of Organic and Organometallic Syntheses

All of the organometallic syntheses were carried out under an inert argon atmosphere using either Schlenk techniques or a glove box. All the solvents used during the syntheses are dry and are kept under an inert atmosphere. The pentane and the THF are freshly distilled over sodium/benzophenone. All of the reactants come from Sigma-Aldrich, Strem and Fluka.

Synthesis of rare-earth tris[N,N-bis(trimethylsilyl)amides] complexes

The rare-earth tris[N,N-bis(trimethylsilyl)amide] complexes were synthesized according to the method described by Bradley et al., (Bradley, D. C., Ghotra, J. S., and Hart, F. A., *J. Chem. Soc., Dalton Trans.* 1973, 1021) and modified by Boisson et al. (Boisson, C., Barbotin, F., and Spitz, R., *Macromol. Chem. Phys.* 1999, 200, 1163).

Synthesis of N-(2,6-diisopropyl)phenyl-3,5-di-tert-butylsalicylaldimine

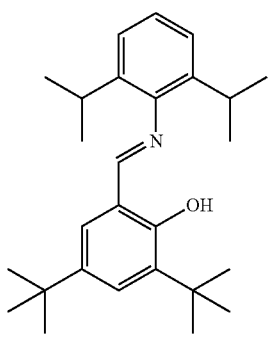

The N-(2,6-diisopropyl)phenyl-3,5-di-tert-butylsalicylaldimine was synthesized according to the procedure described by Cameron et al. (Cameron, P. A., Gibson, V. C., Redshaw, C., Segal, J. A., Solan, G. A., White, A. J. P., and Williams, D. J. J., *Chemical Society, Dalton Transactions* 2001, 1472).

Examples of Polymerization

All of the preparations of the catalytic systems were carried out under an inert argon atmosphere, using either Schlenk techniques or a glove box. All the solvents used during these preparations are dry and are under an inert atmosphere. The toluene and the heptane are dried twice over a molecular sieve. All of the reactants come from Sigma-Aldrich, Strem and Fluka. The solutions of triisobutylaluminium, diethylaluminium chloride and N-(2,6-diisopropyl)phenyl-3,5-di-tert-butylsalicylaldimine were prepared in heptane, from pure reactants, at concentrations of 0.740, 0.027 and 0.100 mol·L$^{-1}$ respectively.

The molecular weights of the polymers soluble in THF are determined by size-exclusion chromatography in THF. The samples are injected using a Waters 717 injector into a series of columns placed in a chamber thermostatically controlled at 45° C. The detection takes place using a Waters 410 refractometer and the molecular weights of the polybutadienes are expressed in polystyrene equivalents (using Polymer Laboratories certified polystyrene standards). The microstructure is determined by FT-IR on a Nicolet 460 FT-IR spectrometer (measured at ambient temperature over 32 scans from 500 to 3800 cm$^{-1}$) according to the method described by Morero et al. (Morero, D., Santambrogio, A., Porri, L., and Ciampelli, F., *Chim. Ind. (Milano)* 1959, 41).

The polymerizations take place in a reactor having a 250 ml disposable vessel made of glass (Schott flask), equipped with a stainless steel stirrer blade. The temperature is controlled owing to a thermostatically controlled water bath, connected to a polycarbonate jacket. This reactor possesses all the inlets and outlets necessary for conventional handling operations: (i) conditioning of the reactor at 80° C. by vacuum-argon cycles, (ii) introduction of solutions via a canula under a purge of argon and (iii) supplying with gaseous monomers.

Example 1

A solution composed (in order of addition) of 150 ml of heptane, of triisobutylaluminium (1.9 ml-1.4 mmol), of gadolinium tris[N,N-bis(trimethylsilyl)amide] (19.2 mg-0.03 mmol) and of diethylaluminium chloride (2.2 ml-0.06 mmol) is prepared at 23° C. and stirred for 5 minutes. This solution is then injected under argon into a 250 ml glass reactor. Next, the reactor is degassed and the butadiene (10 ml-115 mmol) is introduced. The reactor is heated at 70° C., then the solution is stirred for 30 min. The reaction is stopped by degassing the reactor, then cooling. The polymer is obtained by precipitation into a solution of ethanol (200 ml) and of 2,6-di-tert-butyl-4-methylphenol (5 mg). The polymer (2.5 g) is isolated after drying.

Example 2

A solution composed (in order of addition) of 150 ml of heptane, of triisobutylaluminium (1.9 ml-1.4 mmol), of gadolinium tris[N,N-bis(trimethylsilyl)amide] (192 mg-0.03 mmol), of diethylaluminium chloride (2.2 ml-0.06 mmol) and of N-(2,6-diisopropyl)phenyl-3,5-di-tert-butylsalicylaldimine (0.3 ml-0.03 mmol) is prepared at 23° C. and stirred for 5 minutes. This solution is then injected under argon into a 250 ml glass reactor. Next, the reactor is degassed and the butadiene (10 ml-115 mmol) is introduced. The reactor is heated at 70° C., then the solution is stirred for 30 min. The reaction is stopped by degassing the reactor, then cooling. The polymer is obtained by precipitation into a solution of ethanol (200 ml) and of 2,6-di-tert-butyl-4-methylphenol (5 mg). The polymer (3.5 g) is isolated after drying.

Example 3

A solution composed (in order of addition) of 150 ml of heptane, of triisobutylaluminium (3.2 ml-2.40 mmol), of yttrium tris[N,N-bis(trimethylsilyl)amide] (34.2 mg-0.06 mmol) and of diethylaluminium chloride (4.4 ml-0.12 mmol) is prepared at 23° C. and stirred for 5 minutes. This solution is then injected under argon into a 250 ml glass reactor. Next, the reactor is degassed and the butadiene (10 ml-115 mmol) is introduced. The reactor is heated at 70° C., then the solution is stirred for 240 min. The reaction is stopped by degassing the reactor, then cooling. The polymer is obtained by precipitation into a solution of ethanol (200 ml) and of 2,6-di-tert-butyl-4-methylphenol (5 mg). The polymer (2.5 g) is isolated after drying.

Example 4

A solution composed (in order of addition) of 150 ml of heptane, of triisobutylaluminium (3.2 ml-2.40 mmol), of yttrium tris[N,N-bis(trimethylsilyl)amide] (34.2 mg-0.06 mmol), of diethylaluminium chloride (4.4 ml-0.12 mmol) and N-(2,6-diisopropyl)phenyl-3,5-di-tert-butylsalicylaldimine (0.6 ml-0.06 mmol) is prepared at 23° C. and stirred for 5 minutes. This solution is then injected under argon into a 250 ml glass reactor. Next, the reactor is degassed and the butadiene (10 ml-115 mmol) is introduced. The reactor is heated at 70° C., then the solution is stirred for 60 min. The reaction is stopped by degassing the reactor, then cooling. The polymer is obtained by precipitation into a solution of ethanol (200 ml) and of 2,6-di-tert-butyl-4-methylphenol (5 mg). The polymer (3.3 g) is isolated after drying.

Summary Table of the Results

| Example | Ln (concentration in mmol · l$^{-1}$) | Conversion in % (time in minutes) | Activity in g · mol$^{-1}$ · h$^{-1}$ | $M_n$ in g · mol$^{-1}$ | $I_p$ |
|---|---|---|---|---|---|
| 1 | Gd (0.2) | 37 (30) | 43 | 192000 | 4.0 |
| 2 | Gd (0.2) | 56 (30) | 65 | 185000* | 2.8* |
| 3 | Y (0.4) | 39 (240) | 3 | 80000 | 12.1 |
| 4 | Y (0.4) | 53 (60) | 15 | 117000 | 4.9 |

*The molecular weight distribution is bimodal; the data reported are those of the predominant peak (64% of the area); the second peak (36% of the area) has an $M_n$ of 11 000 g · mol$^{-1}$ and an $I_p$ of 1.74.

Summary Table of the Microstructure

| | Microstructure (%) | | |
|---|---|---|---|
| Example | cis-1,4 | trans-1,4 | 1,2 |
| 1 | 98.8 | 1.2 | 0 |
| 2 | 98.7 | 1.3 | 0 |
| 3 | 95.1 | 4.1 | 0.8 |
| 4 | 91.3 | 6.4 | 2.3 |

The addition of an N-(2,6-diisopropyl)phenyl-3,5-di-tert-butylsalicylaldimine additive during the preparation of a catalytic system based on gadolinium or yttrium tris[N,N-bis(trimethylsilyl)amide] makes it possible to increase the catalytic activity. The stereospecificity of the catalyst is not adversely affected since the cis-1,4 contents remain high (>90% for yttrium and >98% for gadolinium).

The invention claimed is:

1. A catalytic polymerization system comprising:
   (i) a rare-earth complex of Formula (II) Ln(A)$_3$(B)$_n$, in which
      Ln is a rare-earth metal from the family of lanthanides or yttrium or scandium,
      A is a ligand chosen from the family of organophosphates, the family of alcoholates, the family of amides, the family of alkyls, aryls or benzyls or the family of borohydrides,
      B is a Lewis base selected from the group consisting of ethers, amines, phosphates, and thioethers, and
      n is a number ranging from 1 to 3;
   (ii) an alkylating agent;
   (iii) a compound based on an aromatic ring and having at least two heteroatoms chosen from the elements O, N, S, P, and corresponding to the Formula (III):

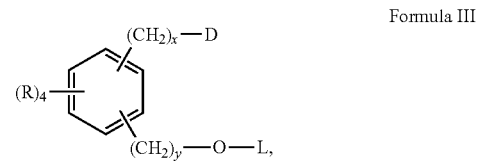

Formula III wherein
   the R groups are identical to or different from one another, and each represent either:
   a hydrogen atom,
   an aliphatic, cycloaliphatic or aromatic alkyl radical, optionally comprising one or several heteroatoms (N, O, P, S, Si) or one or more halogen atoms,
   a halogen atom,
   a group based on one or more heteroatoms (N, O, P, S, Si);
   x and y are integers from 0 to 6;
   D is a group having a chemical function, one of the atoms of which has a non-bonding pair;
   L being an atom from column 1 of the Periodic Table.

2. The catalytic polymerization system according to claim 1, wherein in Formula (II), Ln represents yttrium or gadolinium.

3. The catalytic polymerization system according to claim 1, wherein the alkylating agent is chosen from triisobutylaluminium or diisobutylaluminium hydride.

4. The catalytic polymerization system according to claim 1, wherein in Formula (III), L is an atom from column 1 of the Periodic Table chosen from hydrogen, lithium, sodium, or potassium.

5. The catalytic polymerization system according to claim 1, wherein in Formula (III), D is a group having a function chosen from alcohol, amine, ether, imine, phosphine, thioether, or thiol functions.

6. The catalytic polymerization system according to claim 5, wherein the compound of Formula (III) is chosen from those represented by Formula (IV):

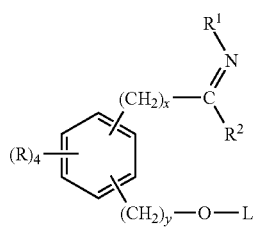

Formula IV wherein:
the R groups are identical to or different from one another, and each represent either:
a hydrogen atom,
an aliphatic, cycloaliphatic or aromatic alkyl radical, optionally comprising one or several heteroatoms (N, O, P, S, Si) or one or more halogen atoms,
a halogen atom,
a group based on one or more heteroatoms (N, O, P, S, Si);
x and y are integers from 0 to 6; and
wherein $R^1$ and $R^2$, which are identical or different, are each a hydrogen atom or a $C_1$-$C_{20}$ aliphatic, $C_5$-$C_{20}$ cycloaliphatic or $C_6$-$C_{20}$ aromatic alkyl radical.

7. The catalytic polymerization system according to claim 6, wherein in Formula (IV), x and y are equal and have a value of 0.

8. The catalytic polymerization system according to claim 7, wherein the compound of Formula (IV) is chosen from phenoxyimines of Formula (V):

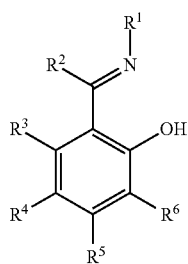

Formula V in which $R^1$ and $R^2$ which are identical or different, are each a hydrogen atom or a $C_1$-$C_{20}$ aliphatic, $C_5$-$C_{20}$ cycloaliphatic or $C_6$-$C_{20}$ aromatic alkyl radical and $R^3$ to $R^6$ are identical to or different from one another, and each represent either:
a hydrogen atom,
an aliphatic, cycloaliphatic or aromatic alkyl radical, optionally comprising one or several heteroatoms (N, O, P, S, Si) or one or more halogen atoms,
a halogen atom,
a group based on one or more heteroatoms (N, O, P, S, Si).

9. The catalytic polymerization system according to claim 8, wherein the phenoxyimine of Formula (V) is chosen from N-phenyl-3,5-di-tert-butylsalicylaldimine or N-(2,6-diisopropyl)phenyl-3,5-di-tert-butylsalicylaldimine.

10. The catalytic polymerization system according to claim 1, further comprising a preforming amount of a conjugated diene, thereby obtaining a preformed catalyst.

11. The catalytic polymerization system according to claim 1, wherein a molar ratio of compound of Formula III to rare-earth metal has a value between 0 and 3.

12. The catalytic polymerization system according to claim 1, wherein a molar ratio of alkylating agent to rare-earth metal has a value ranging from 2 to 40.

13. A process for preparing a catalytic system according to claim 1, comprising:
reacting in situ in an inert hydrocarbon-based solvent comprising a monomer to be polymerized by the catalytic system:
the rare-earth complex,
the compound of Formula (III),
the alkylating agent, and also, where appropriate,
a halogen donor,
thereby providing said catalytic system.

14. A process for preparing a catalytic system according claim 1, comprising:
directly premixing, in an inert hydrocarbon based solvent prior to contacting the monomer to be polymerized by the catalytic system:
the rare-earth complex,
the compound of Formula (III),
the alkylating agent, and also, where appropriate,
a halogen donor,
thereby obtaining said catalytic system.

15. A process for preparing a catalytic system according to claim 6, comprising:
combining, in an inert hydrocarbon-based solvent:
the rare-earth complex,
the compound of Formula (IV),
the alkylating agent, and also, where appropriate,
a halogen donor, and
a preforming amount of a conjugated diene, thereby obtaining a preformed catalytic system.

16. A process for preparing a diene elastomer having a content of cis-1,4 linkages substantially greater than 90%, comprising:
reacting in a continuous or batch reaction a catalytic system in an inert hydrocarbon-based solvent with at least one conjugated diene monomer to be polymerized, wherein said catalytic system is as defined in claim 1.

17. A process for preparing a polymer according to claim 16, wherein said monomer is chosen from butadiene or isoprene.

18. A catalytic polymerization system comprising:
(i) a rare-earth complex of Formula (II) $Ln(A)_3(B)_n$, in which
Ln is a rare-earth metal from the family of lanthanides or yttrium or scandium,
A is a ligand chosen from the family of amides,
B is a Lewis base selected from the group consisting of ethers, amines, phosphates, and thioethers, and
n is a number ranging from 0 to 3;
(ii) an alkylating agent;
(iii) a compound based on an aromatic ring and having at least two heteroatoms chosen from the elements O, N, S, P, and corresponding to the Formula (III):

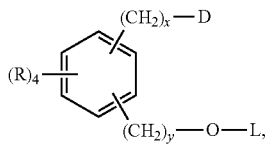

Formula III wherein
the R groups are identical to or different from one another, and each represent either:
a hydrogen atom,
an aliphatic, cycloaliphatic or aromatic alkyl radical, optionally comprising one or several heteroatoms (N, O, P, S, Si) or one or more halogen atoms,
a halogen atom,
a group based on one or more heteroatoms (N, O, P, S, Si);
x and y are integers from 0 to 6;
D is a group having a chemical function, one of the atoms of which has a non-bonding pair;
L being an atom from column 1 of the Periodic Table.

19. The catalytic polymerization system according to claim 18, wherein in Formula (II), A is a ligand chosen from N,N-bis[(trialkylsilyl)alkyl]amides.

20. The catalytic polymerization system according to claim 18, wherein in Formula (II), A is N,N-bis(trimethylsilyl)amide.

21. A catalytic polymerization system comprising:
(i) a rare-earth complex of Formula (II) Ln(A)$_3$(B)$_n$, in which
Ln is a rare-earth metal from the family of lanthanides or yttrium or scandium,
A is a ligand chosen from the family of organophosphates, the family of alcoholates, the family of amides, the family of alkyls, aryls or benzyls or the family of borohydrides,
B is a Lewis base selected from the group consisting of ethers, amines, phosphates, and thioethers, and
n is a number ranging from 1 to 3;
(ii) an alkylating agent;
(iii) a compound based on an aromatic ring and having at least two heteroatoms chosen from the elements O, N, S, P, and corresponding to the Formula (III):

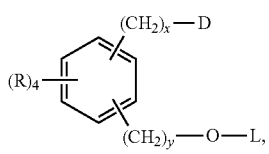

Formula III wherein
the R groups are identical to or different from one another, and each represent either:
a hydrogen atom,
an aliphatic, cycloaliphatic or aromatic alkyl radical, optionally comprising one or several heteroatoms (N, O, P, S, Si) or one or more halogen atoms,
a halogen atom,
a group based on one or more heteroatoms (N, O, P, S, Si);
x and y are integers from 0 to 6;
D is a group having a chemical function, one of the atoms of which has a non-bonding pair;
L being an atom from column 1 of the and Periodic Table further comprising a halogen donor compound.

22. The catalytic polymerization system according to claim 21, wherein the halogen donor is a dialkylaluminium halide.

23. A catalytic polymerization system comprising:
a rare-earth complex of Formula (II) Ln(A)$_3$(B)$_n$, in which
Ln is a rare-earth metal from the family of lanthanides or yttrium or scandium,
A is a ligand chosen from the family of organophosphates, the family of amides, the family of alkyls, aryls or benzyls or the family of borohydrides,
B is a Lewis base selected from the group consisting of ethers, amines, phosphates, and thioethers, and
n is a number ranging from 0 to 3;
(ii) an alkylating agent;
(iii) a compound based on an aromatic ring and having at least two heteroatoms chosen from the elements O, N, S, P, and corresponding to the Formula (III):

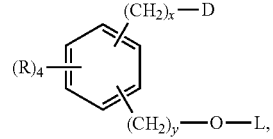

Formula III wherein
the R groups are identical to or different from one another, and each represent either:
a hydrogen atom,
an aliphatic, cycloaliphatic or aromatic alkyl radical, optionally comprising one or several heteroatoms (N, O, P, S, Si) or one or more halogen atoms,
a halogen atom,
a group based on one or more heteroatoms (N, O, P, S, Si);
x and y are integers from 0 to 6;
D is a group having a chemical function, one of the atoms of which has a non-bonding pair;
L being an atom from column 1 of the Periodic Table.

* * * * *